United States Patent
Robichon et al.

(10) Patent No.: US 9,648,891 B2
(45) Date of Patent: May 16, 2017

(54) PROCESS FOR MANUFACTURING OF A FERMENTED DAIRY PRODUCT

(75) Inventors: Florence Robichon, Viry Chatillon (FR); Bruno Lecanu, Figny (FR); Marie-Claude Bezenger, Bruyeres-le-Chatel (FR); Laurence Peyraud, Sceaux (FR); Hassina Ait Abderrahim, Antony (FR); Jean-Marie Odinot, Remereville (FR)

(73) Assignees: YOPLAIT FRANCE, Paris (FR); CHR. HANSEN A/S, Horsholm (DK)

( * ) Notice: Subject to any disclaimer, the term of this patent is extended or adjusted under 35 U.S.C. 154(b) by 70 days.

(21) Appl. No.: 13/375,279

(22) PCT Filed: Jun. 3, 2010

(86) PCT No.: PCT/EP2010/057790
§ 371 (c)(1),
(2), (4) Date: Mar. 13, 2012

(87) PCT Pub. No.: WO2010/139765
PCT Pub. Date: Dec. 9, 2010

(65) Prior Publication Data
US 2012/0156327 A1    Jun. 21, 2012

(30) Foreign Application Priority Data
Jun. 3, 2009  (EP) .................................... 09305510

(51) Int. Cl.
A23C 9/12     (2006.01)
A23C 9/123    (2006.01)
A23C 19/032   (2006.01)
A23C 19/076   (2006.01)

(52) U.S. Cl.
CPC ........ A23C 9/1238 (2013.01); A23C 19/0323 (2013.01); A23C 19/076 (2013.01); *A23C 2220/206* (2013.01)

(58) Field of Classification Search
CPC . A23C 9/1238; A23C 19/076; A23C 19/0323; A23C 2220/206
USPC .............................. 426/34, 42, 43, 580, 583
See application file for complete search history.

(56) References Cited

U.S. PATENT DOCUMENTS

| | | |
|---|---|---|
| 5,382,438 A | 1/1995 | Hottinger et al. |
| 2005/0196388 A1 | 9/2005 | Benbadis et al. |
| 2007/0292561 A1 | 12/2007 | Garault et al. |
| 2009/0238921 A1 | 9/2009 | Druesne et al. |

FOREIGN PATENT DOCUMENTS

| | | |
|---|---|---|
| EP | 0575010 | 12/1993 |
| EP | 0638642 | 2/1995 |
| EP | 1749448 | 2/2007 |
| WO | WO 99/18807 | 4/1999 |
| WO | WO 03/075669 | 9/2003 |
| WO | WO 2007/147890 | 12/2007 |

OTHER PUBLICATIONS

Written Opinion in International Application No. PCT/EP2010/057790, Mar. 14, 2011, pp. 1-8.

*Primary Examiner* — Leslie Wong
(74) *Attorney, Agent, or Firm* — Saliwanchik, Lloyd & Eisenschenk

(57) ABSTRACT

The present invention relates to a process for manufacturing fermented dairy products, in particular stirred milk products. The invention concerns a process for the manufacture of a fermented dairy product without any cooling step for stopping fermentation due to the use of a weakly post-acidifying lactic bacterium culture as a starter.

18 Claims, 1 Drawing Sheet

PROCESS FOR MANUFACTURING OF A FERMENTED DAIRY PRODUCT

CROSS-REFERENCE TO RELATED APPLICATION

This application is the U.S. national stage application of International Patent Application No. PCT/EP2010/057790, filed Jun. 3, 2010, the disclosure of which is hereby incorporated by reference in their entirety, including all figures, tables and amino acid or nucleic acid sequences.

The present invention relates to a process for manufacturing fermented dairy products, in particular stirred milk products.

TECHNICAL BACKGROUND

Processes for manufacturing stirred milk products typically comprise fermentation of an inoculated milk base in large stirred fermentation or culturing tanks, cooling of the final coagulum, and then storage and packaging of the final dairy product.

The cooling step after fermentation is a key step in this process. This step is necessary to stop the fermentation activity of inoculated lactic bacteria and to set the final acidity of the product. The cooling step involves a continuous agitation of the fermented mass in the tank during the transfer operation to the cooler, a pumping and a pipe transfer followed by a smoothing step using a static filter, a smoothing valve or a rotor stator machine. The cooling operation is usually performed by using a heat exchanger (e.g. plate, tube or scrapped surface heat exchangers) followed by a storage step in a tank before packing.

This step leads to a high viscosity loss due to shear stress applied during tank agitation, smoothing, pumping, pipe transfer and cooling.

The cooling temperature set point is thus determined as a compromise between the final product acidity and viscosity.

In order to increase the viscosity of the final product, some manufacturers add thickening agents to the milk base before fermentation. Nevertheless, these complements involve additional costs. Another possibility is to proceed only small amounts of dairy products. In order to control final acidity, some manufacturers also use lactose negative mutants of *Lactobacillus* and limited quantities of glucose on the fermentation media.

Consequently, there is a need for an alternative cost-efficient process for manufacturing fermented milk that combines high texture preservation and sustainable acidity control during storage and packing.

SUMMARY OF THE INVENTION

The object of the present invention is to provide a new cost-efficient process for the manufacture of fermented dairy products. The inventors have shown that the use of weakly post-acidifying starter culture allows in particular to suppress the cooling step before packing.

On this basis, the present invention provides a new process for the manufacture of a fermented dairy product comprising subjecting a milk base to fermentation with a weakly post-acidifying lactic bacterium culture as a starter, said starter providing, at fermentation temperature, a profile of acidification comprising an initial period of pH decrease down to a desired pH value, followed by a period of at least 30 hours in which the desired pH value does not substantially fluctuate, wherein the process does not comprise a cooling step or heat treatment for stopping fermentation. In a particular embodiment, the present invention provides a process for the manufacture of a fermented dairy product, such a yogurt, comprising (a) subjecting a milk base to fermentation with a starter consisting of a weakly post-acidifying bacterial culture, until a desired pH value in the range of 4.0 and 5.0 is reached; (b) maintaining the fermented dairy product at the fermentation temperature during a period of at least 30 hours after having reached the desired pH; and (c) packaging the fermented dairy product, wherein the weakly post-acidifying bacterial culture is defined as having a two-phase acidification profile, as determined by the continuous recordation of the pH as a function of time, in a milk base comprising 3.5% (w/w) fat, 3.72% (w/w) protein, 5.68% (w/w) lactose, 0.89% (w/w) ash and 13.79% (w/w) total solids at 38° C., comprising an initial period lasting 8 to 24 hours of sigmoidal pH decrease down to a pH value of above 4.0, followed by a period of at least 30 hours in which the pH value does not fluctuate more than 0.3 unit.

In another particular embodiment, the present invention provides a process for the manufacture of a fermented dairy product such as a yogurt comprising (a) subjecting a milk base to fermentation with a starter until a desired pH value in the range of 4.0 and 5.0 is reached, said starter comprising at least one *Streptococcus thermophilus* strain and at least one *Lactobacillus delbrueckii* subsp. *bulgaricus* strain selected from the group consisting of DSM 17959 deposited on 8 Feb. 2006, DSM 18144 deposited on 30 Mar. 2006 and DSM 19252 deposited on 3 Apr. 2007; (b) maintaining the yogurt at the fermentation temperature during a period of at least 30 hours after having reached the desired pH; and (c) packaging the yogurt.

LEGENDS OF THE FIGURES

DETAILED DESCRIPTION OF THE INVENTION

Figure 1:
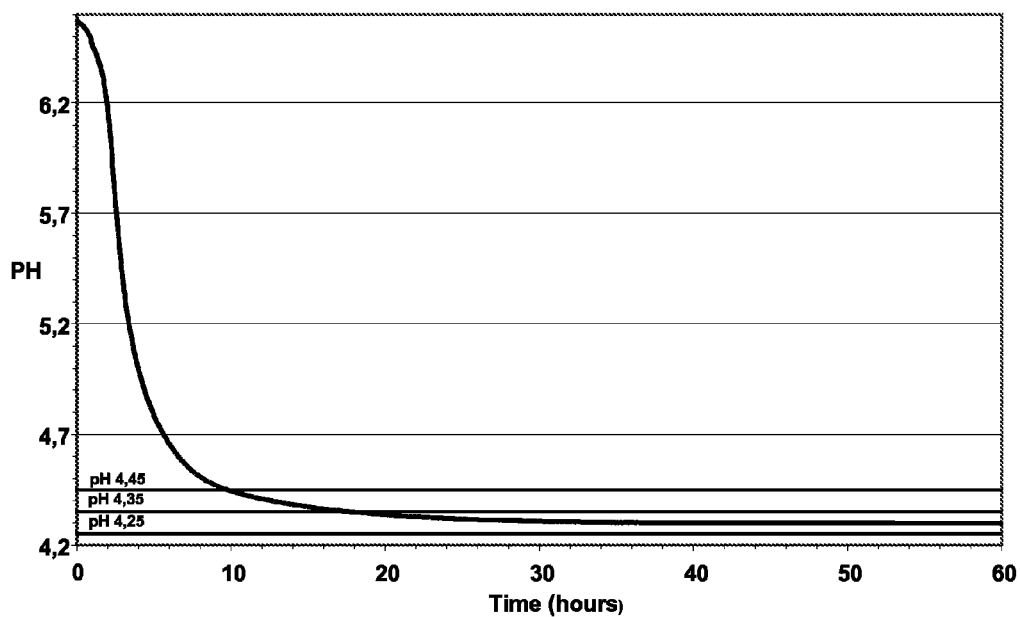
FIG. 1 shows the variation of pH during fermentation of milk with the culture Y-051054.

By screening and research, the inventors of the present invention have found that certain bacterial cultures, which can be selected in a screening for weakly post-acidifying bacterial cultures have desired properties with regard to high texture preservation when used as starters in the preparation of fermented dairy products.

The present invention provides a new process for the manufacture of a fermented dairy product wherein the cooling step to control the fermentation and the acidification before packing is not needed. Furthermore, the process according to the present invention allows a long storage time period before packing at fermentation temperature, a decrease of water and energy consumptions as well as a lower initial financial investment compared to processes of the prior art.

The process of the invention involves the fermentation of a milk base inoculated with particular starter bacteria in order to obtain a fermented dairy product with a low development of acidity during shelf life, particularly before the packing of this product.

DEFINITIONS

As used herein the term "milk base" includes whole milk, skim milk, fat-free milk, low fat milk, full fat milk, lactosefree or lactose-reduced milk (produced by hydrolyzing the lactose by lactase enzyme to glucose and galactose, or by other methods such as nanofiltration, electrodialysis, ion exchange chromatography and centrifugation technology), concentrated milk or dry milk. Fat-free milk is non-fat or skim milk product. Low-fat milk is typically defined as milk that contains from about 1% to about 2% fat. Full fat milk often contains 2% fat or more. The term "milk" is intended to encompass milks from mammals and plant sources. Preferably, the milk is from a mammal source. Mammals sources of milk include, but are not limited to cow, sheep, goat, buffalo, camel, llama, mare and deer. In an embodiment, the milk is from a mammal selected from the group consisting of cow, sheep, goat, buffalo, camel, llama, mare and deer, and combinations thereof. Plant sources of milk include, but are not limited to, milk extracted from soy bean, pea, peanut, barley, rice, oat, quinoa, almond, cashew, coconut, hazelnut, hemp, sesame seed and sunflower seed. Soy bean milk is preferred. In addition, the term "milk" refers to not only whole milk, but also skim milk or any liquid component derived therefrom.

The process according to the invention can be used to manufacture various types of fermented dairy products. As used in this specification, the term "fermented dairy product" or "acidified dairy product" is intended to refer to products which are obtained by the multiplication of lactic acid bacteria in a milk base leading to a milk coagulum. The milk preparation used as raw material for the fermentation may be skimmed or non-skimmed milk, optionally concentrated or in the form of powder. Furthermore, this milk preparation may have been subjected to a thermal processing operation which is at least as efficient as pasteurisation. The particular characteristics of the various fermented dairy products depend upon various factors, such as the composition of milk base, the incubation temperature, the lactic acid flora and/or non-lactic acid flora. Thus, fermented dairy products manufactured herein include, for instance, various types of regular yoghurt, low fat yoghurt, non fat yoghurt, kefir, ymer, buttermilk, butterfat, sour cream and sour whipped cream as well as fresh cheeses.

As used in the present specification, the term "yoghurt" refers to products comprising lactic acid bacteria such as *Streptococcus thermophilus* and *Lactobacillus delbruekii* subsp. *bulgaricus*, but also, optionally, other microorganisms such as *Lactobacillus delbruekii* subsp. *lactis*, *Bifidobacterium animalis* subsp. *lactis*, *Lactococcus lactis*, *Lactobacillus acidophilus* and *Lactobacillus casei*, or any microorganism derived therefrom. The lactic acid strains other than *Streptococcus thermophilus* and *Lactobacillus delbruekii* subsp. *bulgaricus*, are intended to give the finished product various properties, such as the property of promoting the equilibrium of the flora. As used herein, the term "yoghurt" encompasses set yoghurt, stirred yoghurt, drinking yoghurt, Petit Suisse, heat treated yoghurt and yoghurt-like products. Preferably, the yogurt is a stirred yogurt or a drinking yogurt. More preferably, the yogurt is a stirred yogurt.

The term "yoghurt" encompasses, but is not limited to, yoghurt as defined according to French and European regulations, e.g. coagulated dairy products obtained by lactic acid fermentation by means of specific thermophilic lactic acid bacteria only (i.e. *Lactobacillus delbruekii* subsp. *bulgaricus* and *Streptococcus thermophilus*) which are cultured simultaneously and are found to be live in the final product in an amount of at least 10 million CFU (colony-forming unit)/g. Preferably, the yogurt is not heat-treated after fermentation. Yoghurts may optionally contain added dairy raw materials (e.g. cream) or other ingredients such as sugar or sweetening agents, one or more flavouring(s), fruit, cereals, or nutritional substances, especially vitamins, minerals and fibers. Such yoghurt advantageously meets the specifications for fermented milks and yoghurts of the AFNOR NF 04-600 standard and/or the codex StanA-lla-1975 standard. In order to satisfy the AFNOR NF 04-600 standard, the product must not have been heated after fermentation and the dairy raw materials must represent a minimum of 70% (m/m) of the finished product.

In the present context, the terms "fresh cheese", "unripened cheese", "curd cheese" and "curd-style cheese" are used interchangeably herein to refer to any kind of cheese such as natural cheese, cheese analogues and processed cheese in which the protein/casein ratio does not exceed that of milk.

The fermentation step of the process for manufacturing fermented dairy products requires the addition of a starter to a sterilized milk base. The term "starter" or "starter culture" as used herein refers to a culture of one or more food-grade micro-organisms, in particular lactic acid bacteria, which are responsible for the acidification of the milk base. Starter cultures may be fresh, frozen or freeze-dried. Freeze dried cultures need to be regenerated before use. For the production of a fermented dairy product, the starter is usually added in an amount from 0.01 to 3%, preferably from 0.01 and 0.02% by weight of the total amount of milk base.

As used herein, the term "lactic acid bacteria" (LAB) or "lactic bacteria" refers to food-grade bacteria producing lactic acid as the major metabolic end-product of carbohydrate fermentation. These bacteria are related by their common metabolic and physiological characteristics and are usually Gram positive, low-GC, acid tolerant, non-sporulating, non-respiring, rod-shaped bacilli or cocci. During the fermentation stage, the consumption of lactose by these bacteria causes the formation of lactic acid, reducing the pH and leading to the formation of a protein coagulum. These bacteria are thus responsible for the acidification of milk and for the texture of the dairy product. As used herein, the term "lactic acid bacteria" or "lactic bacteria" encompasses, but is not limited to, bacteria belonging to the genus of *Lactobacillus* spp., *Bifidobacterium* spp., *Streptococcus* spp., *Lactococcus* spp., such as *Lactobacillus delbruekii* subsp. *bulgaricus*, *Streptococcus thermophilus*, *Lactobacillus lactis*, *Bifidobacterium animalis*, *Lactococcus lactis*, *Lactobacillus casei*, *Lactobacillus plantarum*, *Lactobacillus helveticus*, *Lactobacillus acidophilus* and *Bifidobacterium breve*.

As used in the present specification, the term "cooling step" or "cooling step for stopping fermentation" means lowering the temperature of the fermented product in order to stop or to dramatically slow down the fermentation process. The cooling step generally lasts less than one minute, preferably about 10-20 seconds. In an embodiment, during the cooling step, the temperature of the fermented product is lowered of at least 10° C., preferably of at least 15° C. and more preferably of at least 20° C. In a preferred embodiment, during the cooling step, the temperature of the fermented product is lowered of at least 25° C. In a particular embodiment, the temperature of the fermented product after the cooling step is in the range of 5° C. to 30° C., preferably in the range of 10° C. to 25° C., more preferably in the range of 10° C. to 20° C., and still more preferably between 10° C. and 15° C.

The term "weakly post-acidifying" or "low post-acidifying" refers to the acidification profile of a bacterium or a bacterial culture useful in the present invention. Post-acidification is the production of lactic acid occurring after the end of the fermentation. This phenomenon is usually controlled by the cooling of the product after fermentation. Indeed, this cooling step stops or slows down the bacterium metabolism and thus reduces the production of lactic acid. In the process of the present invention, this cooling step has been suppressed thanks to the use of bacterium cultures with weakly post-acidifying properties as a starter. These cultures are characterized by a weak production of lactic acid at fermentation temperature after the end of the fermentation step thereby providing a substantially steady pH value.

Weakly post-acidifying bacterium cultures may be selected by the follow-up of the pH of a final fermented milk base by using any method known by the skilled person. As example, a CINAC system (CINEtic ACidification) may be used. In this system a pH meter is connected to a computer recorder and pH is continuously recorded as a function of time to obtain sigmoidal curves representing the acidification. During the follow-up of the pH, the milk is maintained at fermentation temperature in a thermoregulated bath. This method is exemplified in the experimental section.

In a particular embodiment, the weakly post-acidifying culture is a culture having a two-phase acidification profile in a milk base comprising 3.5% (w/w) fat, 3.72% (w/w) protein, 5.68% (w/w) lactose, 0.89% (w/w) ash and 13.79% (w/w) total solids at 38° C., as determined by the continuous recordation of the pH as a function of time, comprising an initial period lasting 8 to 24 hours of sigmoidal pH decrease down to a pH value of above 4.0, followed by a period of at least 30 hours in which the pH value does not fluctuate more than 0.3 unit. Thus, according to the present invention the weakly post-acidifying culture may be selected as having the mentioned two-phase acidification profile in a screening process involving continuously measuring the pH in a milk base comprising 3.5% (w/w) fat, 3.72% (w/w) protein, 5.68% (w/w) lactose, 0.89% (w/w) ash and 13.79% (w/w) total solids at 38° C. inoculated with the weakly post-acidifying culture, and exemplified in the Examples below.

As used in the present specification, the term "exopolysaccharide-producing strain" or "EPS-producing strain" refers to bacteria which are capable of producing polysaccharides, namely exopolysaccharides (EPS), in their culture medium. EPS-producing strains are particularly interesting in dairy product manufacture because they can provide a ropy character and/or a smooth and creamy texture to a fermented dairy product. Produced polysaccharides can be divided into two groups: homopolysaccharides and heteropolysaccharides. Homopolysaccharides consist of the repeated assembly of a single sugar and can be subdivided into four groups, namely alpha-D-glucans, beta-D-glucans, beta-D-fructans, and others like polygalactan. Heteropolysaccharides consist of the assembly of several different sugars forming a repeating unit most often containing a combination of D-glucose, D-galactose, and L-rhamnose, and, in a few cases, fucose, nononic acid, ribose, acetylated amino sugars and glucuronic acid, as well as non-carbohydrate substituents such as phosphate, acetyl and glycerol.

Manufacture of the Dairy Products

The present invention provides a process for the manufacture of a fermented dairy product comprising subjecting a milk base to fermentation with a weakly post-acidifying lactic bacterium culture as starter, said starter providing, at fermentation temperature, a particular profile of acidification which allows suppressing the usual cooling step for stopping fermentation. The acidification profile of a starter inoculated to a milk base is monitored by measuring pH value at fermentation temperature and corresponds to the decrease of the pH value of the fermenting milk as a function of time.

This acidification is due to the lactic acid fermentation operated by starter bacteria by which sugars such as lactose are converted into cellular energy and the metabolic waste product lactic acid.

The acidification profile of starter bacteria used in the present invention comprises two distinguishable phases, as determined by the continuous recordation of the pH as a function of time: an initial period lasting 8 to 24 hours of sigmoidal pH decrease down to a desired pH value, preferably above 4.0, followed by a period of at least 30 hours in which the desired pH value does not fluctuate or does not substantially fluctuate, preferably does not fluctuate of more than 0.3 unit.

The first phase, also called in this specification "initial period", starts from the inoculation of the milk base with the starter culture to the end of the fermentation step. As used herein, the "end of the fermentation step" is intended to be the time when the milk coagulum reaches the desired pH value. The desired pH value depends on the type of the dairy product to manufacture. The pH value depends on the bacterium culture, the fermentation temperature and the formulation of the milk base, in particular on the buffering capacity of this base. The skilled person can obtain the desired pH by varying one or several of these parameters. As example, the skilled person who wishes to decrease the obtained pH value may, for instance, (i) increase the ratio of *lactobacillus delbrueckii* subsp. *bulgaricus* in the starter culture, (ii) increase the quantity of protein powder in the formulation of the milk base to increase the buffering capacity of this base, and/or (iii) increase the fermentation temperature.

In an embodiment, the desired pH value is in the range of 4.0 and 5, preferably in the range of 4.0 to 4.7, more preferably in the range of 4.3 and 4.5, and even more preferably in the range of 4.35 and 4.45.

The duration of the initial period, i.e. the duration of the fermentation step, depends essentially on the starter culture used and the fermentation temperature. In an embodiment, the duration of the initial period is in the range of 8 to 24 hours, preferably in the range of 10 to 20 hours.

The fermentation temperature and the fermentation time not only influence the production efficiency of the product but also highly influence the flavour and quality of the product. Therefore, the fermentation temperature should appropriately be set by the skilled person depending on the desired characteristics of the dairy product. For example, in order to obtain mild flavour for the product, the fermentation temperature is set to a lower temperature which is consequently accompanied by a longer fermentation time. In an embodiment, the fermentation temperature used in the process of the invention is in the range of 32° C. to 44° C., preferably in the range of 36° C. to 42° C. and more preferably in the range of 37° C. to 39° C.

The second phase of the acidification profile is a period of at least 30 hours in which the desired pH value obtained at the end of the fermentation step does not substantially fluctuate. Preferably, this second phase is a period of at least 48 hours. This pH stability keeps the organoleptic properties of the dairy product, in particular acidity, steady. In a particular embodiment, the desired pH value does not fluctuate of more than 0.3 unit, preferably of more than 0.2 unit. In a particular embodiment, during this second phase, the fermented dairy product is maintained at the fermentation temperature during a period of at least 30 hours, preferably during at least 48 hours. Preferably, during this period the desired pH value does not fluctuate of more than 0.3 unit, preferably of more than 0.2 unit.

The weakly post-acidifying starter culture used in the process of the invention preferably comprises one or more bacteria belonging to the genus of *Lactobacillus* spp., *Bifidobacterium* spp., *Streptococcus* spp. or *Lactococcus* spp., preferably selected from the group consisting of *Lactobacillus delbrueckii* subsp. *bulgaricus*, *Streptococcus thermophilus*, *Lactobacillus delbrueckii* subsp. *lactis*, *Bifidobacterium animalis*, *Lactococcus lactis* subsp. *lactis*, *Lactobacillus casei*, *Lactobacillus plantarum*, *Lactobacillus helveticus*, *Lactobacillus acidophilus* and *Bifidobacterium breve*.

In a particular embodiment, the starter culture comprises a single bacterium strain.

In another embodiment, the starter culture comprises a combination of at least two bacterium strains.

In a further embodiment, the starter culture comprises at least one *Lactobacillus* strain, preferably at least one *Lactobacillus delbrueckii* subsp. *bulgaricus* selected from the group consisting of DSM 17959 deposited by Chr. Hansen on Feb. 8, 2006, DSM 18144 deposited by Chr. Hansen on Mar. 30, 2006 and DSM 19252 deposited by Chr. Hansen on Apr. 3, 2007 at Deutsche Sammlung von Mikroorganismen und Zellkulturen GmbH (DSMZ), Inhoffenstr. 7B, D-38124 Braunschweig, Germany.

In a particular embodiment, the starter culture comprises at least one *Lactobacillus* strain and at least one *Streptococcus* strain. In a preferred embodiment, the starter comprises at least one *Lactobacillus delbrueckii* subsp. *bulgaricus* and at least one *Streptococcus thermophilus*. Preferably, *Lactobacillus delbrueckii* subsp. *bulgaricus* strain is selected from the group consisting of DSM 17959 deposited by Chr. Hansen on Feb. 8, 2006, DSM 18144 deposited by Chr. Hansen on Mar. 30, 2006 and DSM 19252 deposited by Chr. Hansen on Apr. 3, 2007 at Deutsche Sammlung von Mikroorganismen und Zellkulturen GmbH (DSM). In a particular embodiment, the starter culture comprises the *Lactobacillus delbrueckii* subsp. *Bulgaricus* strain DSM 19252 deposited on Apr. 3, 2007 at Deutsche Sammlung von Mikroorganismen and Zellkulturen GmbH. In another particular embodiment, the starter culture contains at least one *Streptococcus thermophilus* strain and at least one *Lactobacillus delbrueckii* subsp. *bulgaricus* strain selected from the group consisting of DSM 17959 deposited on 8 Feb. 2006, DSM 18144 deposited on 30 Mar. 2006 and DSM 19252 deposited on 3 Apr. 2007.

Any type of dairy product may be manufactured according to the process of the invention.

In a preferred embodiment, the fermented dairy product manufactured by the process of the invention is a yoghurt or a fresh cheese. In a particular embodiment, the fermented dairy product manufactured by the process of the invention is a yoghurt, preferably a stirred yogurt or a drinking yogurt.

The viscosity of the final product is satisfying without the need of adding thickening or texturing agents or increasing the amount of starting material.

Stirred yoghurts or stirred fermented milk products are usually produced through a process including a smoothing stage, i.e. a step of breaking fermented milk curds, eliminating gritty texture upon eating and roughness in outward appearance of the product. Drinking yoghurts or fermented milk products in a liquid form may be obtained by using a homogenizer to further pulverize the curd particles.

In an embodiment, additional food-grade bacteria are added to the starter culture in order to provide additional characteristics to the milk coagulum, for example, probiotic properties, texture and/or flavour improvements. These additional bacteria may be lactic bacteria or non-lactic food-grade bacteria and they have to not disturb the acidification profile of the starter culture used in the present invention. Preferably, additional food-grade bacteria provide probiotic properties and may be selected from the group consisting of *Bifidobacterium* spp, *Lactobacterium acidophilus*, *Lactobacterium plantarum* or *Lactobacterium casei*.

In another embodiment, the milk base is inoculated with at least one EPS-producing strain. This strain may be a lactic acid strain or a non-lactic food-grade strain. This EPS-producing strain may be comprised within the starter culture or may be added to the starter culture. Preferably, EPS-producing strains are selected from the group consisting of *Steptococcus thermophilus*, *Lactobacillus bulgaricus* and *Lactococcus* spp.

In a particular embodiment, the process of the invention further comprises a step of packing the fermented dairy product without any cooling step or heat treatment between fermentation and packaging. The suppression of cooling step before packing allows minimizing viscosity loss, decreasing water and energy consumptions and increasing the cost-efficiency of the process. In a preferred embodiment, the packaging of the fermented dairy product is carried out immediately after the second phase of the acidification profile, i.e. immediately after the period of at least 30 hours in which the desired pH value obtained at the end of the fermentation step does not substantially fluctuate, preferably does not fluctuate of more than 0.3 unit, more preferably does not fluctuate of more than 0.2 unit. In a particular embodiment, the second phase of the acidification profile is a period of at least 48 hours. In this case, the packaging of the fermented dairy product is carried out immediately after this period of at least 48 hours. Optionally, the packaging of the fermented dairy product is carried out at about the fermentation temperature. As used herein, the term "about" refers to a range of values ±10% of the specified value, preferably ±5% of the specified value.

According to one embodiment of the present invention the packaging step c) follows directly after step b) wherein the fermented dairy product is maintained at the fermentation temperature for at least 30 hours.

During the process of the invention, one or more optional ingredients, in addition to microorganisms, can be added to the milk base, such as vitamins (for example, vitamin A and/or vitamin D), additional dairy products (for example, cream milk, partially skimmed milk, skim milk, or a combination of any of these), and other ingredients that can increase the non-fat solids content of the food (such as concentrated skim milk, non-fat dry milk, buttermilk, whey, lactose, lactalbumins, lactoglobulins, or whey modified by partial or complete removal of lactose and/or minerals), nutritive carbohydrate sweeteners (such as sugar, invert sugar, brown sugar, refiner's syrup, molasses, high fructose corn syrup, fructose, fructose syrup, maltose, maltose syrup, dried maltose syrup, malt extract, dried malt extract, malt syrup, dried malt syrup, honey, maple sugar, or others), flavouring ingredients, colour additives, texturizing agents, thickening agents and/or stabilizers, such as gelatine, starch, modified starch, high-methoxyl (HM) and low-methoxyl (LM) pectins, hydrocolloids and gums (e.g. carob, arabic, xanthan, guar). These optional ingredients may be added at any step of the manufacturing process. However, the fermentation of the process of the invention is not controlled by the content of a nutrient or ingredient added to the milk base. This means that the fermentation of milk base by the starter culture is not stopped by exhaustion of a nutrient added to the milk base.

Based on the above disclosure, the present invention provides, in a preferred embodiment, a process for the manufacture of a yogurt comprising subjecting a milk base to fermentation with a starter until a desired pH value in the range of 4.0 and 5.0, said starter comprising at least one *Streptococcus thermophilus* strain and at least one *Lactobacillus delbrueckii* subsp. *bulgaricus* strain selected from the group consisting of DSM 17959 deposited on 8 Feb. 2006, DSM 18144 deposited on 30 Mar. 2006 and DSM 19252 deposited on 3 Apr. 2007; (b) maintaining the yogurt at the fermentation temperature during a period of at least 30 hours after having reached the desired pH, the desired pH value not fluctuating during said period of more than 0.3 unit; and (c) packaging the yogurt.

The following example is given for purpose of illustration and not by way of limitation.

EXAMPLES

Example 1

Manufacture of a Stirred Yoghurt

The milk base was prepared to contain the relevant concentration of fat and protein content, i.e. 3.5% (w/w) fat, 3.72% (w/w) protein, 5.68% (w/w) lactose, 0.89% (w/w) ash and 13.79% (w/w) total solids (Becker, T. and Puhan, Z. (1989) Milchwissenschaft 44, 626-629).

The specific quantity of milk was mixed with the right quantity of skimmed milk powder and cream, at 4° C.

The base was mixed during 30 minutes. The milk base was heated at 92° C. during 6.5 minutes at 250 bars and then cooled to 38° C. before to be placed into a fermentation tank wherein the temperature was maintained at fermentation temperature. The milk base was inoculated with the culture Y-051054 (marketed by Chr. Hansen) in an amount of 0.02% by weight of milk base. This culture is made of three strains of *Streptococcus thermophilus* and one strain of *Lactobacillus delbrueckii* subsp. *bulgaricus*.

The incubation took place at 38° C. until pH reached 4.45. Then the fermented milk was stirred and was not cooled.

Determination of the Acidification Cinetic

The CINAC system (CINetic ACidification) allows measuring the pH of the milk during the fermentation. A pH meter is connected to a computer recorder and pH is continuously recorded as a function of time to obtain sigmoidal curves representing the acidification. The milk is maintained at fermentation temperature in a thermoregulated bath.

Results

FIG. 1 shows variations of pH during fermentation with Y-051054. At fermentation temperature, the pH initially decreased down to 4.45. The fermented milk was then stirred and the pH was stabilised at 4.3 during at least 50 hours.

These results demonstrate that the process of the invention allows to suppress the cooling step for stopping fermentation.

Example 2

Manufacture of a Stirred Yoghurt

The protocol was exactly the same as in example 1, except that the milk base was inoculated with the M1B culture (marketed by Chr. Hansen) in an amount of 0.02% by weight of milk base. This culture is made of the *Lactobacillus delbrueckii* subsp. *Bulgaricus* strain DSM 19252 deposited on Apr. 3, 2007 at Deutsche Sammlung von Mikroorganismen and Zellkulturen GmbH and a strain of *Streptococcus thermophilus*.

Determination of the Acidification Cinetic

The CINAC system (CINetic ACidification) was used to assess acidification as in example 1.

Results

Figure 2:
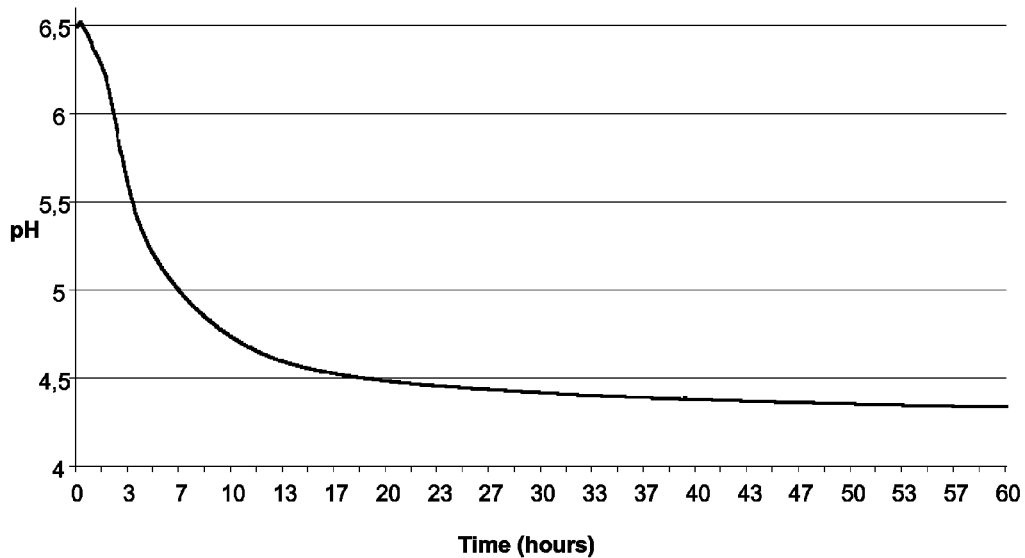
FIG. 2 shows the variation of pH during fermentation of milk with the culture M1B.

FIG. 2 shows variations of pH during fermentation with M1B. At fermentation temperature, the pH initially decreased down to 4.45. The fermented milk was then stirred and kept to fermentation temperature until 60 hours. In 36 hours, the pH value fluctuates of only 0.12 unit.

Consequently, these results show that the process of the invention allows to suppress the cooling step for stopping fermentation before packaging the fermented milk.

The invention claimed is:

1. A process for the manufacture of a fermented dairy product, the process comprising: (a) subjecting a milk base to fermentation with a weakly post-acidifying bacterial starter culture until a desired pH value in the range of 4.0 to 5.0 is reached to produce a fermented dairy product; (b) maintaining the fermented dairy product at the fermentation temperature during a period of at least 30 hours after having reached the desired pH; and (c) packaging the fermented dairy product, wherein the weakly post-acidifying bacterial starter culture has a two-phase acidification profile, as determined by the continuous recordation of the pH as a function of time, in a milk base comprising 3.5% (w/w) fat, 3.72% (w/w) protein, 5.68% (w/w) lactose, 0.89% (w/w) ash and 13.79% (w/w) total solids at 38° C., the two phase acidification profile comprising an initial period lasting 8 to 24 hours of sigmoidal pH decrease down to a pH value of above 4.0, followed by a period of at least 30 hours in which the pH value does not fluctuate more than 0.3 unit and wherein the fermentation of the milk base by the starter culture is not stopped by exhaustion of a nutrient added to the milk base and wherein the process does not comprise a cooling step before packaging.

2. The process according to claim 1, wherein the fermented dairy product is a yogurt.

3. The process according to claim 1, wherein the starter culture comprises at least one *Lactobacillus delbrueckii* subsp. *bulgaricus* strain selected from the group consisting of DSM 17959, DSM 18144 and DSM 19252.

4. The process according to claim 3, wherein the starter culture further comprises at least one *Streptococcus thermophilus* strain.

5. The process according to claim 1, wherein the starter culture contains at least one *Streptococcus thermophilus* strain and at least one *Lactobacillus delbrueckii* subsp. *bulgaricus* strain selected from the group consisting of DSM 17959, DSM 18144 and DSM 19252.

6. The process according to claim 1, wherein the starter culture further comprises an exopolysaccharide-producing bacterium strain.

7. The process according to claim 1, wherein the fermented dairy product is maintained at fermentation temperature during a period of at least 48 hours.

8. The process according to claim 1, wherein the desired pH value does not fluctuate during said period by more than 0.2 unit or 0.3 unit.

9. The process according to claim 1, wherein the fermentation temperature is in the range of 32° C. to 44° C. or in the range of 37° C. to 39° C.

10. The process according to claim 1, wherein the desired pH value is in the range of 4.0 to 4.7 or in the range of 4.3 to 4.5.

11. The process according to claim 1, wherein the milk is from a mammal selected from the group consisting of cow, sheep, goat, buffalo, camel, llama, mare, deer, and combinations thereof.

12. The process according to claim 1, wherein the fermented dairy product is a stirred yogurt or a drinking yogurt.

13. The process according to claim 1, wherein the fermented dairy product is not heat-treated after fermentation.

14. The process according to claim 1, wherein step (c) follows directly after step (b).

15. The process according to claim 1, wherein one or more vitamin has been added to said milk base.

16. The process according to claim 15, wherein vitamin A has been added to said milk base.

17. The process according to claim 15, wherein vitamin D has been added to said milk base.

18. The process according to claim 15, wherein vitamin A and vitamin D have been added to said milk base.

* * * * *